United States Patent

Bergmeister et al.

[15] 3,668,165
[45] June 6, 1972

[54] DISPERSION POLYMERIZED TERPOLYMER OF VINYL ACETATE, VINYL ESTER OF A FATTY ACID, AND VINYL CHLORIDE

[72] Inventors: Eduard Bergmeister; Joseph Heckmaier; Paul-Gerhard Kirst; Hubert West, all of Burghausen/Upper Bavaria, Germany

[73] Assignee: Wacker-Chemie GmbH, Munich, Germany

[22] Filed: Sept. 11, 1970

[21] Appl. No.: 71,362

Related U.S. Application Data

[63] Continuation of Ser. No. 727,692, May 8, 1968.

[30] Foreign Application Priority Data

May 10, 1967 Germany..............................W 43960

[52] U.S. Cl........................260/29.6 T, 260/17 A, 260/23 R, 260/23 XA, 260/23 EM, 260/80.81
[51] Int. Cl. .......................................................C08f 15/40
[58] Field of Search..............260/23 R, 23 EM, 23 X, 29.6 T, 260/80.81

[56] References Cited

UNITED STATES PATENTS 2,118,864  5/1938  Reppe et al. ..................260/80.81 UX

OTHER PUBLICATIONS

Schildknecht, Polymer Process, pages 105– 109 (1956) cited as Schildknecht
Schildknecht, Vinyl and Related Polymers, pages 398– 402 (1952) cited as Schildknecht (I)
Smith, Vinyl Resins, pages 92– 93 (1958)

*Primary Examiner*—Donald E. Czaja
*Assistant Examiner*—Donald J. Barrack

[57] ABSTRACT

This invention relates to a process for the preparation of an aqueous polymerizate dispersion which comprises the steps of subjecting 100 parts by weight of a monomer mixture consisting of: (a) 40 to 70 parts by weight of vinyl acetate, (b) 15 to 30 parts by weight of a vinyl ester of fatty acids having eight to 18 carbon atoms and (c) 15 to 30 parts by weight of vinylchloride to an aqueous dispersion polymerization in the presence of (1) free-radical forming catalysts, (2) at least one protective colloid and (3) an emulsifier selected from the group consisting of anionic emulsifiers, non-ionic emulsifiers and mixtures thereof, and recovering said aqueous polymerizate dispersion, as well as the aqueous polymerizate dispersions so produced.

5 Claims, No Drawings

DISPERSION POLYMERIZED TERPOLYMER OF VINYL ACETATE, VINYL ESTER OF A FATTY ACID, AND VINYL CHLORIDE

REFERENCE TO PRIOR APPLICATION

This application is a continuation of our prior copending U.S. Pat. application Ser. No. 727,692, filed May 8, 1968.

THE PRIOR ART

It is known that through so-called "dispersion polymerization" of vinyl acetate alone or in combination with other monomers, aqueous polymerizate dispersions can be prepared, (see Schildknecht "Polymer Process," Interscience Publishers Inc., New York 1956, pages 105 to 109).

The products which are formed on the drying of the aqueous dispersions of homopolymerizates of vinyl acetate, for instance coating films, have the disadvantage that their saponification stability and wet abrasion resistance is too low for many fields of application. It is known that the saponification stability of polyvinylacetate is increased through mixed polymerization with vinylchloride. Aqueous dispersions of such mixed polymerizates, however, are not very stable against mechanical stress, as occurs in the incorporation of pigments and fillers into the dispersions and, in addition, the temperatures at which they dry to homogenous films are considerably higher than 25° C. Furthermore, those films obtained through the drying of such dispersions are brittle and inflexible. It is further known that the saponification stability of polyvinylacetate is increased through mixed polymerization with vinyl esters of fatty acids having eight to 18 carbon atoms. The required amount of units of the vinyl esters of the higher fatty acids in the polymerizates necessary for a satisfactory high saponification stability causes, however, that the films from the aqueous dispersions of these mixed polymerizates are very soft and sticky and thus soil very easily. It would be expected that aqueous dispersions of mixed polymerizations from vinyl esters of fatty acids having eight to 18 carbon atoms and vinylchloride would dry to films which possess high saponification stability and wet abrasion resistance as well as being flexible, not too soft and not too sticky. Such polymerizate dispersions, however, are very unstable towards mechanical stress so that often they coagulate during the polymerization. In addition, they contain inhomogeneous polymerizates and a considerable part of unpolymerized fatty acid esters, which cannot be eliminated from the dispersions due to their high boiling point and thus disturb the subsequent working-up procedures.

In addition, cation-active aqueous polymerizate dispersions are known containing as polymerizates such as 40 parts by weight of vinyl acetate, 35 parts by weight of vinylchloride and 25 parts by weight of vinyl laurate. Such dispersions, however, are only usable in such areas as cation-active polymerizate dispersions are usable. The films obtained from such dispersions are not completely free from so-called specks and "fish eyes" and readily yellow.

OBJECTS OF THE INVENTION

An object of the invention is the obtention of polymerizate dispersions based on vinyl acetate, vinyl esters of higher fatty acids and vinylchloride which are freeze resistant, saponifaction resistant, resistant to mechanical stress, have a high pigment binding capability and which dry at room temperatures to give clear, tough, elastic, light-proof, water-proof and non-sticky films having a high saponification stability and wet abrasion resistance.

Another object of the invention is the development of a process for the preparation of an aqueous polymerizate dispersion which comprises the steps of subjecting 100 parts by weight of a monomer mixture consisting of: (a) 40 to 70 parts by weight of vinyl acetate, (b) 15 to 30 parts by weight of a vinyl ester of fatty acids having eight to 18 carbon atoms and (c) 15 to 30 parts by weight of vinylchloride to an aqueous dispersion polymerization in the presence of (1) free-radical forming catalysts, (2) at least one protective colloid and (3) an emulsifier selected from the group consisting of anionic emulsifiers, non-ionic emulsifiers and mixtures thereof, and recovering said aqueous polymerizate dispersion.

These and other objects of the invention will become more apparent as the description thereof proceeds.

DESCRIPTION OF THE INVENTION

By means of the process of the invention, the above objects can be achieved and polymerizate dispersions can be prepared which are free from those disadvantages described above. Through the process of the invention, polymerizate dispersions can be prepared which are freeze resistant, saponification stable, stable to mechanical stress as, for instance, those which occur already during the polymerization process or during the repumping or during the mixing with fillers and/or pigments. These polymerizate dispersions have an excellent pigment binding quality and dry at room temperatures, that is at 18° to 25° C to give clear, tough, elastic, light-proof, water-proof, non-sticky films which have a high saponification stability and wet abrasion resistance.

The process of the invention for the preparation of aqueous polymerizate dispersions through dispersion polymerization of mixtures of monomers containing vinyl esters of fatty acids having eight to 18 carbon atoms and vinylchloride is characterized in that those mixtures of monomers which are to be polymerized contain:

A. 40 to 70 parts by weight of vinyl acetate.
B. 15 to 30 parts by weight of a vinyl ester of fatty acids having eight to 18 carbon atoms, and
C. 15 to 30 parts by weight of vinylchloride, where the sum of (A), (B) and (C) together are 100 parts by weight of the monomer mixture and that, in addition to the use of at least one protective colloid, as an emulsifier, anionic and/or non-ionic emulsifiers are used.

The quantitative relations of the invention are critical. If more than 70 parts by weight of the 100 parts by weight of the mixture of monomers which are to be polymerized consists of vinyl acetate, then the saponification stability of the polymerizate dispersions is unsatisfactory. If less than 40 parts by weight of the 100 parts by weight of the mixture of monomers to be polymerized consists of vinyl acetate, then the polymerizate dispersions are very unstable towards mechanical stress and coagulation occurs already during the polymerization. If more than 30 parts by weight of the 100 parts by weight of the mixture of monomers to be polymerized consists of vinyl esters of higher fatty acids then, too, the polymerizate dispersions are unstable towards mechanical stress and the films from such dispersions are soft and sticky. If less than 15 parts by weight of the 100 parts by weight of the mixture of monomers to be polymerized consists of vinyl esters of the higher fatty acids, then the polymerizate dispersions dry to homogenous films only at temperatures of over room temperature and these films are, in addition, brittle. If more than 30 parts by weight of the 100 parts by weight of the mixture of monomers to be polymerized consists of vinylchloride, then the polymerizate dispersions are unstable towards mechanical stress and dry to homogenous films only at temperatures of over room temperature as well. If less than 15 parts by weight of the 100 parts by weight of the mixture of monomers to be polymerized consists of vinylchloride, then the saponification stability of the polymerizate dispersions is unsatisfactory.

Preferably, the mixture of monomers to be polymerized consists of 45 to 55 parts by weight of vinyl acetate, 20 to 30 parts by weight of vinyl esters of fatty acids having eight to 18 carbon atoms, in particular vinyl laurate, and 20 to 30 parts by weight of vinylchloride where the total of the amount by weight of the monomers mentioned above is always 100 parts by weight.

In place of a mixture with vinyl laurate, other vinyl esters of fatty acids having eight to 18 carbon atoms can be employed as well. Examples for such fatty acid esters are vinyl esters of capric acid, 2-ethyl hexanoic acid, tridecyclic acid, and stearic acid, as well as mixtures of saturated, alkanoic acids with eight to 18 carbon acids, where the carboxylic acid group is attached directly to a tertiary or quarternary carbon atom, as those acids obtained, for instance, through a reaction of monoolefins with carbon monoxide and water in the presence of acid catalysts such as boron trifluoride.

In the process of the invention, all of those protective colloids can be used as protective colloids which so far have been used or could be used for dispersion polymerization. Examples for such protective colloids are polyvinylalcohol which may possess up to 40 mol percent of acyl groups, especially acetyl groups, gelatine and cellulose derivatives such as water-soluble methylcelluloses, carboxymethylcelluloses, hydroxyethylcelluloses, hydroxyethylmethylcelluloses, hydroxypropylmethylcelluloses, mixed polymerizates of maleic acid or its halfesters with styrene, starch, dextrine derivatives, polyvinylpyrrolidone and polyacrylic acidamide. Mixtures of different protective colloids can be used as well. Preferably, the protective colloids are utilized in amounts of from 0.5 to 4 percent by weight, based on the total weight of the polymerization monomers.

In addition to the protective colloids, anionic and/or non-ionic emulsifiers are utilized in the process of the invention. The use of such emulsifiers in combination with the protective colloids is not new for dispersion polymerization, however it is novel for the polymerization of mixtures of vinyl acetate, vinyl esters of fatty acids having eight to 18 carbon atoms and vinylchloride.

Examples of anionic emulsifiers are alkali metal and ammonium salts of straight or branched chained monocarboxylic acids having eight to 18 carbon atoms, particularly alkanoic acids, for example, sodium laurate or sodium stearate; of alkyl esters of acid phosphoric acid, for example, sodium diethylhexylphosphate; of esters of alkanols having nine to 18 carbon atoms, and acid sulphuric acid, for example, sodium laurylsulfate; of secondary sulfonic acids of alkanes having 10 to 18 carbon atoms; of alkylarylsulfonic acids; of sulfonated polyoxyethylene ethers; of alkylphenols; and of sulphosuccinic acid dialkyl esters. Mixtures of different anionic emulsifiers can also be used. Preferably, the anionic emulsifiers are utilized in amounts of from 0.03 to 1 percent by weight, based on the total weight of the polymerization monomers utilized.

Examples for non-ionic emulsifiers are, for example, fatty acid partial esters of polyhydroxy alcohols, particularly higher fatty acid partial esters of alkanepolyols, such as glycerine monostearate, sorbitol monolaurate or palmitate, partial fatty alcohol ethers of polyhydroxy alcohols, particularly partial higher fatty alcohol ethers of alkanepolyols, block-mixed polymerizates of ethyleneoxide and propyleneoxide, for example, block polymerizates of 10 mols of ethyleneoxide and 30 mols of propyleneoxide; as well as reaction products of from 4 to 100 mols of ethyleneoxide with 1 mol of organic compounds having at least eight carbon atoms and containing active hydrogen atoms, which compounds are those which on the Zerevitinoff reaction release free hydrogen. These organic, active hydrogen-containing compounds having at least eight carbon atoms may be, for example, fatty acids, hydroxycarboxylic acids, alcohols, alkylphenols, carboxylic acid amides or primary or secondary amines. As an example of the corresponding reaction products of such organic compounds with ethyleneoxide, the reaction products of 1 mol of nonylphenol and 8 to 50 mols of ethyleneoxide or of 1 mol of oleyl alcohol and 20 mols of ethyleneoxide can be mentioned. Mixtures of known different non-ionic emulsifiers may also be employed. Preferably, the non-ionic emulsifiers are employed in amounts of 0.5 to 4 percent by weight, based on the total weight of the polymerizable compounds present. It has proved particularly useful to use anionic as well as non-ionic emulsifiers simultaneously in combination with the protective colloids.

In the process of the invention, all polymerization catalysts which, so far, have been employed in the dispersion polymerization or could be so employed, can be used as polymerization catalysts. This refers primarily to water-soluble free-radical formers, such as hydrogen peroxide, potassium persulfate, ammonium persulfate, sodium perborate, and sodium percarbonate. Sometimes, in particular in redoxy systems, in place of or in combination with water-soluble free-radical formers, monomer-soluble free-radical formers can be employed, such as azodiisobutyric acid dinitrile, tert-butylhydroperoxide or acetylcyclohexanesulfonylperoxide. The free-radical formers are favorably employed in the common redoxy systems, that is in combination with reducing agents such as tartaric acid, sodium formaldehydesulfoxylate, Iron-(II) salts, sodium dithionite, or sodium hydrogensulfite. The polymerization catalysts are employed in amounts customarily utilized in dispersion polymerization, preferably, 0.005 to 1 percent by weight, based on the entire weight of the monomers.

The amount in weight of the monomers to the total weight of these compounds plus water is in the range common for dispersion polymerizations, that is, at approximately 30 to 70 percent by weight.

Preferably, the pH value should be in a range from 3 to 8 during the polymerization. Usefully, the standardization of the desired pH value is advantageously carried out by initial charging or continuous dosing of weakly basic salts, for example, alkali metal salts of weak acids, such as sodium acetate, sodium bicarbonate and/or sec.-sodium phosphate.

The known chain-terminating compounds, such as aldehydes, chlorinated hydrocarbons, and alkylmercaptans may possibly be used in addition at the usual amounts, that is, from 0.001 to 0.3 percent by weight, based on the total weight of the polymerization recipe. As is common in the case of dispersion polymerization, the process of the invention is carried out under stirring and exclusion of oxygen.

In order to carry out the polymerization, the entire polymerization recipe may be put into the polymerization vessel at once or individual components of the polymerization recipe, for instance, the monomers or a portion of the monomers can be dosed into the polymerization vessel during the polymerization. If a redox system is used as a polymerization catalyst, then the polymerization rate can be regulated easily through the extent of the amount of reducing agent which is added in small increments.

Usefully, the polymerization is carried out in a temperature range from 20° to 120° C. In accordance with one form of carrying out the process of the invention, the polymerization is carried out at first at a constant temperature on the range from 40° to 60° C up to a reaction of 40 to 70 percent by weight of the total amount of the monomers employed, then at temperatures raising to 70° to 110° C during 15 to 60 minutes and finally at a constant temperature within the latter range.

By this method, dispersions are obtained which, up to a conversion of over 99.5 percent by weight of the monomers charged are polymerized, are free of coagulum, stable towards mechanical stress and freezing and produce polymerizates with a uniform particle size and a high polymerization degree corresponding to K-values of 60 to 80 (for determination of the K-value see Fikentscher, "Cellulose-chemie," vol. 13 [1932] page 58). The determination of the amount of reaction in the course of polymerization is made according to known methods, for instance, through titration of the monomers, determination of the proportion of polymerizate present, or through measuring of the change in vapor pressure.

The polymerization dispersions prepared according to the invention can be mixed, if desired, with additives such as plasticizers, solvents and natural resins. They can be employed in all cases for which the use of polymerizate dispersions have been recommended so far, particularly those mixed polymerizates with vinyl acetate. The polymerizate dispersions of the invention are particularly suited for coatings on bases which are alkaline, for example, concrete, due to the water-proofness and saponification stability of the polymerizates contained therein, as well as an additive to building materials based on hydraulically setting masses, such as cement, to increasing the bending resistance and abrasion resistance. They are also utilized as coatings for cement roofing tiles, in order to prevent efflorescence. Due to the good adhesion of the polymerizates obtained in the polymerizate dispersions of the invention, these dispersions are excellent adhesive substances and can be used as heat-sealing glues as well.

The following specific examples are illustrative of the practice of the invention. They are not, however, to be deemed limitative in any respect.

The properties of the polymerizate dispersions prepared according to the following examples are given in Table II which follows these examples, in so far as they were not mentioned already in the examples.

EXAMPLE 1

Into a 15 liter pressure vessel which is equipped with a stirring apparatus, a heat transfer mantle as well as pipes for the adding of liquids and taking of samples, first, 2 kg of water, 2 kg of a 10 percent by weight aqueous solution of polyvinylalcohol with residual acetyl groups, saponification value = 20 (that is, the milligrams of KOH required for the saponification and neutralization of the acetyl groups in 1 g substance), 50 g of a nonylphenol polyethyleneglycol ether with an average of approximately 23 ethyleneoxide units per molecule and 7 g of sodium laurylsulfate were charged. After displacement of the air by nitrogen, a mixture of 2.5 kg of vinyl acetate, 1.25 kg of vinyl laurate and 1.25 kg of vinylchloride (parts by weight of the monomers: 50 to 25 to 25; sum of these parts by weight: 100), and 10 g of tert-butylhydroperoxide were charged into the pressure vessel.

The contents of the pressure vessel were then heated to 45° C. Then, a solution of 5 g of sodium formaldehyde sulfoxylate and 11 g of sodium bicarbonate in 500 g of water were charged into the pressure vessel by a dosing pump at a rate of 60 cm³ per hour. Up to a conversion of 55 percent by weight of the total amount of monomers charged, the temperature was kept constant at 45° C. Then, over a period of 30 minutes, the temperature was increased to 90° C and was maintained there until the pressure dropped to 0 atmospheres excess pressure.

The polymerizate dispersion thus obtained has only a low tendency to foam.

EXAMPLE 2

The procedure described in Example 1 was repeated with the variation that in the place of 2.5 kg of vinyl acetate, 2.25 kg of vinyl acetate were used, and in the place of 1.25 kg of vinyl laurate, 1.5 of vinyl laurate were used (parts by weight of the monomers: 45 to 30 to 25: sum of the parts by weight: 100).

EXAMPLE 3

In the polymerization device described in Example 1, first, in 4.6 kg of water, 100 g of hydroxyethyl-cellulose with a viscosity of 300 cP at 25° C, measured in a 2 percent by weight aqueous solution, 70 g of a polyethyleneglycol ether of lauryl alcohol with an average of approximately 10 ethyleneoxide units per molecule and 8 g of a sodium salt of a mixture of sec.-alkylsulfonic acids having 10 to 16 carbon atoms, were dissolved. After displacement of the air by nitrogen, the same charge of monomers was added, as was made in accordance with Example 1, and the polymerization was continued in the same manner as in Example 1.

The polymerization dispersion thus obtained is of medium viscosity, thixotropic and has a high pigment binding capability.

EXAMPLE 4

In the polymerization device described in Example 1, first, in 4.6 kg of water, 50 g of polyvinylpyrrolidone with a K-value of 90, 20 g of hydroxyethylcellulose with a viscosity of 300 cP at 25° C, measured in a 2 percent by weight aqueous solution, 250 g of a polyethyleneglycol ether of tridecanol-(2), with an average of approximately 15 ethyleneoxide units per molecule, and 10 g of sodium laurylsulfate, were dissolved. After displacement of the air by nitrogen, a mixture of 2.75 kg of vinyl acetate, 1.25 kg of vinyl laurate and 1.00 kg of vinylchloride (parts by weight of the monomers: 55 to 25 to 20: sum of parts by weight: 100) and 13 g of tert-butylhydroperoxide were charged into the pressure vessel.

The contents of the pressure vessel were then heated to a temperature of 50° C under stirring, and a solution of 5g of sodium formaldehydesulfoxylate and 11 g of sodium bicarbonate in 500 g of water were added by a dosing pump at a rate of 70 cm³ per hour. Up to a conversion of 65 percent by weight of the total amount of the monomers charged, the temperature was kept constant at 50° C. Then, within 30 minutes, the temperature was increased to 90° C and was maintained until the pressure dropped to approximately 0 atmospheres excess pressure.

The polymerizate dispersion thus obtained was highly viscous and very strongly thixotropic.

COMPARISON EXAMPLES

The procedure described in Example 1 was repeated with the variation that in the prepared polymerization mixtures *a* to *g*, in the place of those monomer mixtures used in Example 1, the following monomer mixtures were employed, which mixtures lie outside of the invention with respect to the critical ratio of monomers.

TABLE I

Monomer Mixture

| mixture | vinyl acetate kg | vinyl laurate kg | vinyl-chloride kg | vinyl acetate | vinyl laurate | vinyl-chloride |
|---|---|---|---|---|---|---|
| | | | | parts by weight of the monomers for the total amount as 100. | | |
| a | 3 | 0 | 2 | 60 | — | 40 |
| b | 2 | 0 | 3 | 40 | — | 60 |
| c | 0 | 3.5 | 1.5 | — | 70 | 30 |
| d | 4.0 | 1.5 | 0.5 | 80 | 10 | 10 |
| e | 1.5 | 1.5 | 2.0 | 30 | 30 | 40 |
| f | 2.0 | 2.5 | 0.5 | 40 | 50 | 10 |
| g | 3.75 | 1.25 | 0 | 75 | 25 | — |

The results of these comparison examples are shown in Table II, together with the results of the examples according to the invention. The figures given in the following Table II give the saponification stability as calculated from the amount of *n*/10 sodium hydroxide in ml respectively which are consumed during 6 hours of refluxing of 2 g of a 50 percent by weight amount of the polymerizate dispersions with 10 ml *n*/10 aqueous sodium hydroxide. This consumption results from the difference between unconsumed sodium hydroxide and the starting 10 ml. This difference is determined through back titrating with *n*/10 aqueous hydrochloric acid.

TABLE II

| Example | Coagulant contents of the dispersion | Pigment compatibility | Freeze stability, −12° C. | Saponification stability | Product after drying of the dispersion at 20° C. | Properties of the film |
|---|---|---|---|---|---|---|
| 1 | Not determinable | Very good | No coagulation | 4.0 | Clear film | Tough, elastic, non-sticky. |
| 2 | do | do | do | 3.5 | do | Do. |
| 3 | do | do | do | 4.6 | do | Do. |
| 4 | do | do | do | 4.6 | do | Hard, non-sticky. |
| a | Completely coagulated | | | | | |
| b | Containing coagulum | Good | Coagulated | 12.8 | Chalky powder | Soft, sticky. |
| c | do | Coagulated completely | do | | Clear film | Brittle. |
| d | Not determinable | Very good | do | 11.2 | do | |
| e | Containing coagulum | Coagulated | Coagulated | 3.3 | Chalky powder | |
| f | Completely coagulated | | | | | |
| g | Not determinable | Very good | No coagulation | 13.0 | Clear film | Slightly sticky. |

The pigment compatibility was determined as follows:

200 gm of a mixture of 92 parts by weight dispersion, 46 parts by weight zinc white —(ZNO)—greenseal, 0.5 parts by weight pigment distributor (ammonia salts of polycarbon acids) and 65 parts by weight water is homogenized in a rolling mill and attention is paid to how much and whether coagulum forms in the funnel tube and remains there. If no coagulum has been observed, the pigment compatibility is very good.

This Table II demonstrates the unexpected properties of the polymerizate dispersions of the invention, particularly with reference to the comparison polymerizate dispersions.

The preceding specific embodiments are illustrative of the practice of the invention. It is to be understood, however, that other expedients known to those skilled in the art or disclosed herein can be utilized without departing from the spirit of the invention or the scope of the appended claims.

We claim:

1. An aqueous polymerizate dispersion composition product which is freeze resistant, saponification stable, stable to mechanical stress and has excellent pigment binding ability consisting essentially of 100 parts by weight of an initial monomer mixture consisting of: (a) 40 to 70 parts by weight of vinyl acetate, (b) 15 to 30 parts by weight of a vinyl ester of fatty acids having eight to 18 carbon atoms and (c) 15 to 30 parts by weight of vinylchloride subject to an aqueous dispersion polymerization in the presence of (1) free-radical forming catalysts, (2) at least one protective colloid and (3) an emulsifier selected from the group consisting of anionic emulsifiers, non-ionic emulsifiers and mixtures thereof.

2. The polymerization product of claim 1 wherein, in said initial monomer mixture, said vinyl ester of fatty acids having eight to 18 carbon atoms is vinyl laurate.

3. The polymerization product of claim 1 wherein, said protective colloid is present in an amount of from 0.5 to 4 percent by weight, based on the total weight of monomers charged, and said emulsifier is present in a mixture of an amount of from 0.3 to 1 percent by weight, based on the total weight of monomers charged, of anionic emulsifiers and from 0.1 to 3 percent by weight, based on the total weight of the monomers charged, of non-ionic emulsifiers.

4. The polymerization product of claim 1 wherein the pH of the polymerization mixture is maintained between 3 and 8 during said aqueous dispersion polymerization.

5. The polymerization product of claim 1 wherein said 100 parts by weight of said initial monomer mixture consists of (a) 45 to 55 parts by weight of vinyl acetate, (b) 20 to 30 parts by weight of vinyl esters of fatty acids having eight to 18 carbon atoms and (c) 20 to 30 parts by weight of vinylchloride.

* * * * *

UNITED STATES PATENT OFFICE
CERTIFICATE OF CORRECTION

Patent No. 3,668,165          Dated June 6, 1972

Inventor(s) Eduard Bergmeister et al.

It is certified that error appears in the above-identified patent and that said Letters Patent are hereby corrected as shown below:

| Column | Line | Errors |
| --- | --- | --- |
| - | - | The last name of the fourth inventor is misspelled and should be -- WIEST --. |
| 1 | 14 | Title of Schildknecht publication should be "Polymer Processes". |
| 4 | 10 | In the term "tert.-butylhydroperoxide" the period after "tert" has been left out. |
| 6 | 57 Table I | Under the heading "Vinyl Laurate kg" Mixture d should read -- 0.5 --. |

Signed and sealed this 22nd day of May 1973.

(SEAL)
Attest:

EDWARD M. FLETCHER, JR.
Attesting Officer

ROBERT GOTTSCHALK
Commissioner of Patents